United States Patent [19]
Eysel

[11] 3,864,054
[45] Feb. 4, 1975

[54] TOOL CARRIER
[75] Inventor: Dieter Eysel, Frankfurt, Germany
[73] Assignee: Samson Apparatebau AG, Frankfurt am Main, Germany
[22] Filed: June 11, 1973
[21] Appl. No.: 368,931

[30] Foreign Application Priority Data
June 12, 1972 Germany............................ 2228553

[52] U.S. Cl. ............................................... 408/147
[51] Int. Cl. .......................................... B23b 29/34
[58] Field of Search ........... 408/147, 146, 186, 187, 408/714

[56] References Cited
UNITED STATES PATENTS
3,007,353  11/1961  Garnett.............................. 408/147

FOREIGN PATENTS OR APPLICATIONS
2,034,601  1/1972  Germany

Primary Examiner—Gil Weidenfeld
Attorney, Agent, or Firm—Woodhams, Blanchard & Flynn

[57] ABSTRACT

A tool carrier, especially for fine work, is provided wherein a cylindrical sleeve is partially cut circumferentially to permit transverse shifting of one end thereof with respect to the other. One end holds the tool and the other end provides the mount. An internally contained expanding device effects the desired shifting and consequent tool adjustment.

6 Claims, 4 Drawing Figures

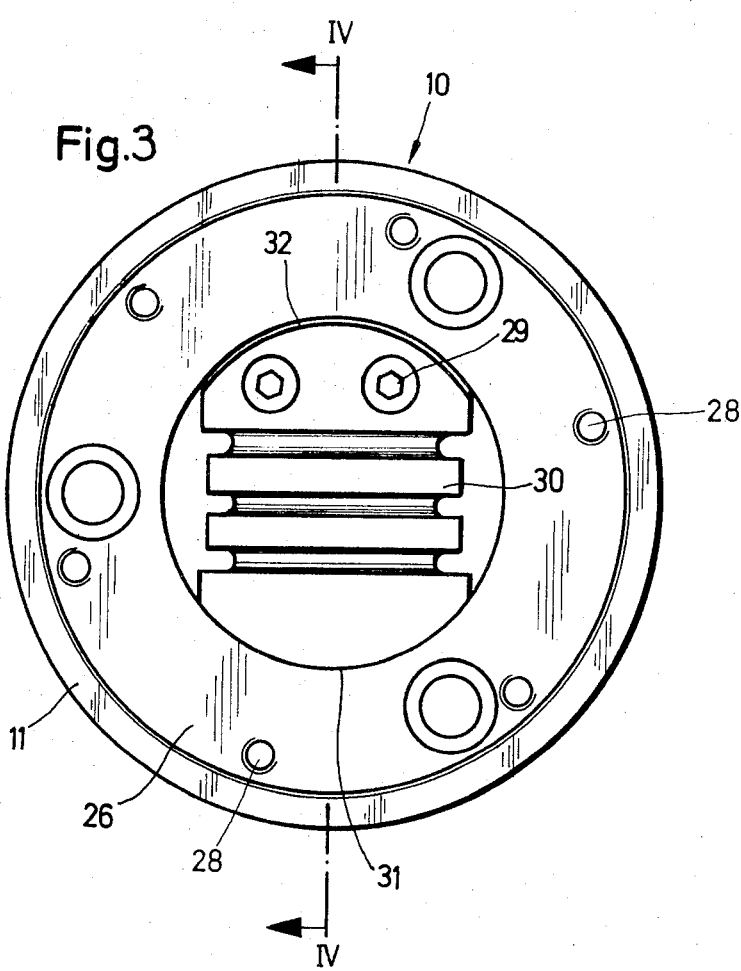

TOOL CARRIER

BACKGROUND OF THE INVENTION

The invention relates to a tool carrier applicable to rotating or stationary tools and wherein a tool receiving plate is resiliently movable with respect to the holding plate for small distances in directions perpendicular to the tool carrier axis.

BACKGROUND OF THE INVENTION

In such rotating tool carriers which are identified for example as boring heads or I.D. turning for fine work, the axially parallel movability between the flangelike tool receiving plate and the also flangelike holding plate is conventionally accomplished by two leaf springs which are arranged parallel to one another and which are secured each on axial projections of such plates. Normally, said projections face one another and are arranged tangentially with respect to the axis of rotation of the tool carrier. The tool screw-on plate is axially moved with respect to the holding plate by a central thrust wedge apparatus, compare firm publication HELLER "Accurately controllable fine boring head," July 1965, Pages 21 to 27.

The structure of such tool carriers is relatively complicated, in particular serious problems are encountered in the manufacture of the flangelike part with its axial projections. The relatively strong parallel springs and the associated thrust wedge apparatus, though made by continuous procedures, must be mounted and adjusted in precise relationship and their reciprocal adjustment must be controlled for repeat operations. Aside from the plurality of individual parts, the extensive mounting, adjusting and servicing operations are burdensome.

Therefore, the basic purpose of the invention is to produce a new, very compact, tool carrier which consists of a minimum of individual parts and which is so constructed that a minimum of mounting and adjusting operations are necessary for its manufacture without detracting from operating accuracy. A further purpose is to provide such a tool which eliminates the thrust wedge apparatus as a final control element, which thrust wedge apparatus requires much room in the axial direction.

This purpose is attained according to the invention by providing a rotationally symmetrical housing having approximately a U-shaped cross section, which housing has in its sleeve-shaped cylinder barrel four parallel, paired and oppositely positioned bores which are parallel to the tangent to the cylinder barrel surface. Each of the side-by-side lying bores are connected by a slot which extends parallel to the aforementioned tangent along their walls. Of a given bore pair, the bore lying near the base surface, is connected to the bore of the other bore pair lying near the tool receiving side, by a slot which also extends circumferentially along its surface, though tangentially ending in same.

According to a further characteristic of the invention, the outer cylinder barrel surface has one recess provided in each zone of paired bores.

The base surface of the tool carrier is advantageously provided with an axially extending portion and the tool receiving side is advantageously provided with a surface for receiving the tool, which surface extends perpendicular with respect to the tool carrier axis and has a plurality of fastener receiving holes therein for holding the tool on the tool receiving surface.

According to a further characteristic of the invention an expandable sleeve enclosed by the cylinder barrel is used as a final control element, which expandable sleeve engages with its faces the inner surfaces of the sleeve-shaped cylinder barrel, which inner surfaces are divided by the slot.

SUMMARY OF THE INVENTION

The tool carrier of the invention consists thus, aside from its final control element, of only a rotationally symmetrical swivel base which can be manufactured simply and very exactly. The sleeve-shaped swivel base is made elastic by the bores extending parallel to the tangent to the outer cylindrical surface together with the slots provided between the bores so that the flanged base surface, which serves to hold the tool carrier, for example in a drill spindle, is connected to the flange side which serves to receive the tool, by two webs which act as parallel springs. In this manner, there becomes possible an elastic transverse displacement of the flange parts, which transverse displacement occurs perpendicular to the tool carrier axis. The expandable sleeve which is enclosed by the sleeve-shaped swivel base and which serves as an adjusting element is supported thereby both on the inner surface of the flange side of the tool carrier and also on the inner surface of the tool receiving side of the tool carrier. These two sleeve parts provide very strong connecting parts. The elimination of the individual springs and connecting elements permits the accommodating of a strong expandable sleeve. Inaccuracies caused by displacements and friction between the individually joined parts, and which are the case in tool carriers known up to now, no longer exist. The webs which act as parallel springs have a greater bending and twisting resistance and can for adjusting the adjustment zone be changed in their flexibility by a simple working of the outer cylinder barrel surface. Thus the tool carrier of the invention is distinguished also by a simplified assembly and an inexpensive manufacture. Maintenance operations are entirely eliminated.

BRIEF DESCRIPTION OF THE DRAWINGS

The invention will be described hereinafter in connection with one exemplary embodiment illustrated in the drawings in form of a rotating tool carrier.

In the drawings:

FIG. 3 is a front view of the tool carrier according to FIG. 1 with the adjusting means.

DETAILED DESCRIPTION

Figure 1:
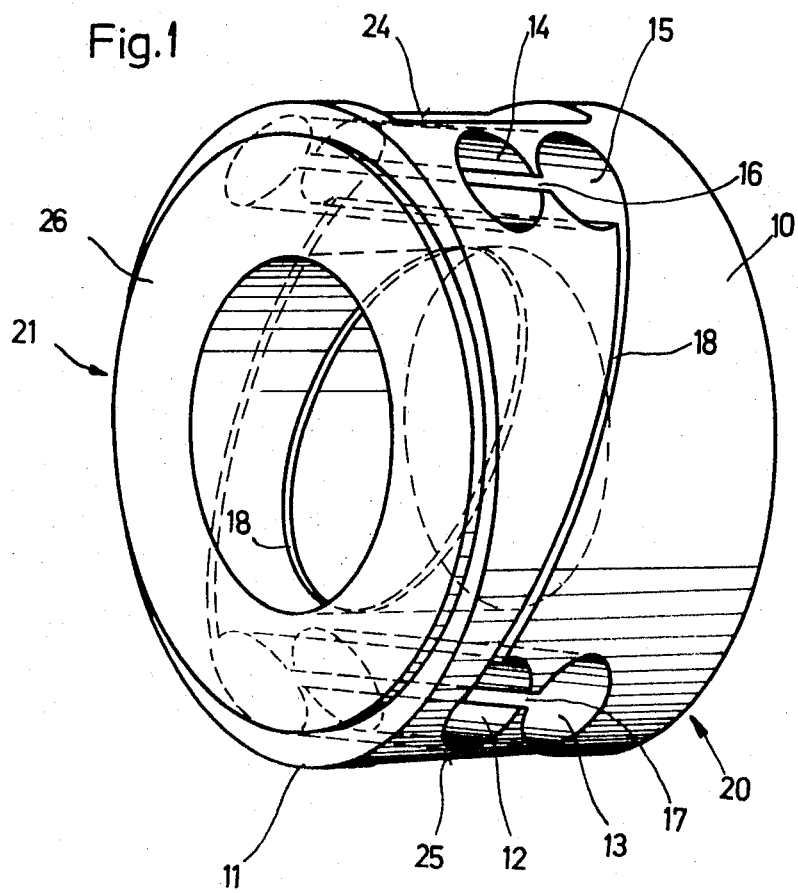
FIG. 1 is a perspective illustration of a tool carrier according to the invention, in which the final control element is omitted for better clarity.
Figure 2:
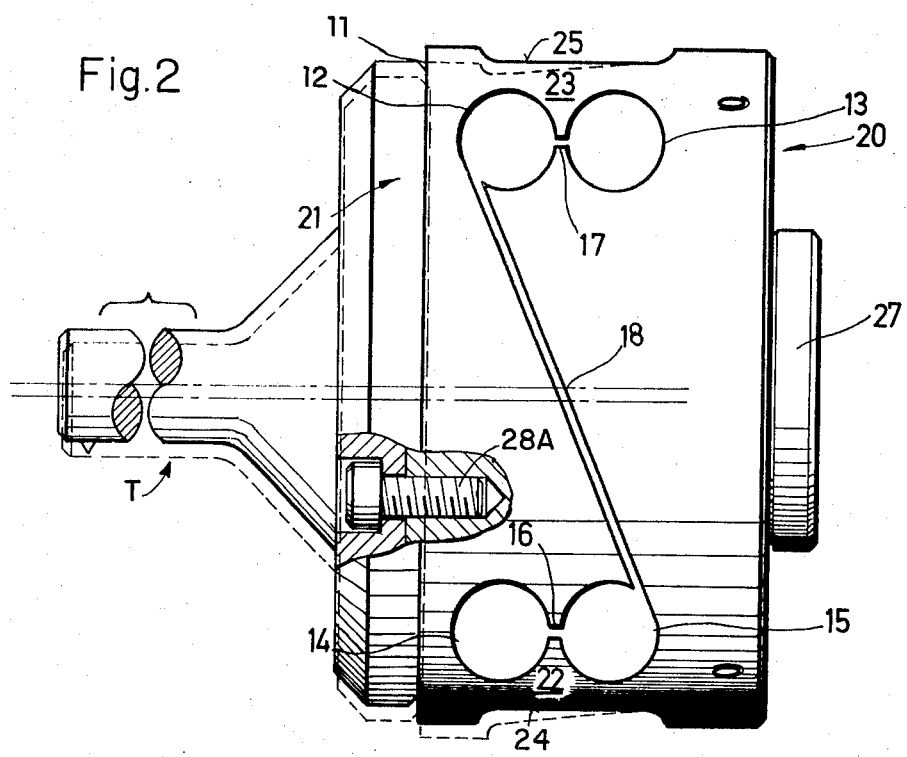
FIG. 2 is a side view of the tool carrier according to FIG. 1 having a tool mounted thereon.
Figure 4:
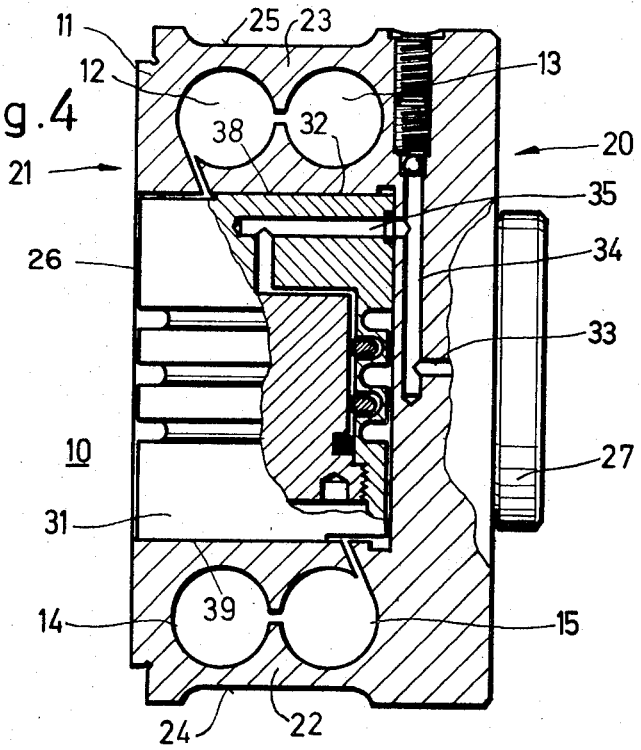
FIG. 4 is a cross-sectional view along the line IV—IV of FIG. 3.

A rotationally symmetrical housing 10 having an approximately U-shaped cross section has, as is shown in FIGS. 1 and 2, in its sleevelike cylinder barrel 11 four parallel, paired and oppositely positioned, bores 12, 13 and 14, 15 which parallel paralle to the tangent with respect to the exterior cylindrical barrel surface. See also FIG. 4. Respective pairs of side-by-side positioned bores 12 and 13 or 14 and 15 are each connected throughout their length by slots 16 or 17 extending parallel to the axis of the bores 12, 13 and 14, 15, respectively.

Further circumferentially extending slots 18 (FIGS. 1 and 2) which extend along the surface of the bores 12 and 15 connect the bore 15 of the one pair of bores, which bore 15 lies near a base portion 20, with the bore 12 of the other pair of bores, which bore 12 lies near a tool receiving side 21.

In this manner webs 22 and 23 are created on the oppositely positioned sides of the cylinder barrel 11, into which webs recesses 24 and 25 can be provided by chip-removing processes. Through this the rigidity of the webs 22 and 23 which serve as springs can be varied or adjusted.

A axially extending extension 27 is provided on the base surface, which extension serves as a holding plate to hold the housing 10 which is used as a tool carrier, for example, in a drill spindle. The surface on the side 21 to which the tool is affixed has, as is illustrated in FIG. 3, a plurality of tapped holes 28 which are used to receive fasteners 28A to hold the tool on the tool receiving surface 26.

An expandable sleeve 30 is constructed as is for example described in German Offenlegungsschrift 1 502 583, corresponds to U.S. Pat. No. 3,389,557. Same is provided with rounded faces 31 and 32 (FIG. 4), is secured on the base portion 20 by screws 29, is encircled by the inner cylindrical barrel surface of the housing 10 and is supplied with a pressure medium through a bore system 33, 34 and 35.

The face 32 is supported on the part 38 (FIG. 4) of the housing 10, which part 38 is rigidly connected to the base portion 20, and the face 31 is supported on the part 39 is connected resiliently to the base portion only through the web 23, so that upon an expansion of the expandable sleeve the tool receiving side 21 is movable transversely with respect to the base side. Since, however, the tool receiving side 21 is also resiliently connected through the web 22 to the base side, this movement occurs, in a direction which is perpendicular to the axis of the housing 10 serving as a tool carrier, thus parallel with respect to the plane of the bore portion 20 to, for example, the position illustrated in broken lines in FIG. 2.

The webs 22 and 23 created by the slotted bores thus form a parallel spring having a high rigidity, which permit with a high degree of exactness a parallel shift of the tool receiving surface 26 with respect to the base plate 20.

The embodiments of the invention in which an exclusive property or privilege is claimed are defined as follows:

1. In a tool carrier for rotating or stationary tools having a tool receiving surface adapted to receive a tool thereon resiliently movable with respect to a base plate for small amounts perpendicular to the tool carrier axis, the improvement comprising means defining a cylindrical housing having generally a U-shaped cross section in axial direction, said housing including means defining two pairs of side-by-side and parallel holes therethrough, each pair being located on opposite sides of said cylindrical housing and which are parallel to a theoretical tangent to the exterior cylindrical surface of said housing means, each of said side-by-side holes in each of said pairs being connected by means defining a slot which extends coextensive with said holes and parallel to said theoretical tangent, each of said holes positioned nearest said base plate being connected to a hole of the other pair which is nearest said tool receiving surface by means defining circumferentially extending and externally opening slots which communicate with the interior of said U-shaped housing so that the end of said housing means having said tool receiving surface thereon is resiliently supported relative to said base plate through web means defined by a portion of said housing means which connects said tool receiving surface with said base plate and means for adjustably moving said tool receiving surface relative to said base plate in a direction perpendicular to said tool carrier axis.

2. The improvement according to claim 1, wherein said exterior cylindrical surface has one recess provided adjacent each of said pair of side-by-side holes.

3. The improvement according to claim 1, wherein said base plate has axial extension thereon and the tool receiving surface has an axially extending portion having a surface thereon defining said tool receiving surface, which surface extends perpendicular to the tool carrier axis and has means defining axially extending holes therein adapted to receive fasteners for securing said tool to said tool receiving surface.

4. The improvement according to claim 1, wherein said adjustable moving means includes an expandable sleeve enclosed by said cylindrical housing, said expandable sleeve having arcuate faces engaging the interior surfaces of said U-shaped housing, which interior surfaces are divided by said circumferentially extending slots for permitting a transverse displacement of said tool receiving surface.

5. The improvement according to claim 1, wherein said adjustable moving means includes an expandable sleeve adapted to be received in said interior of said U-shaped housing means.

6. The improvement according to claim 5, wherein the interior of said U-shaped housing is cylindrical, the axis of which is coaxial with said exterior surface of said housing means and wherein said expandable sleeve has surfaces thereon which cooperate with said cylindrical surface of said interior of said U-shaped housing means.

* * * * *